Patented Dec. 21, 1926.

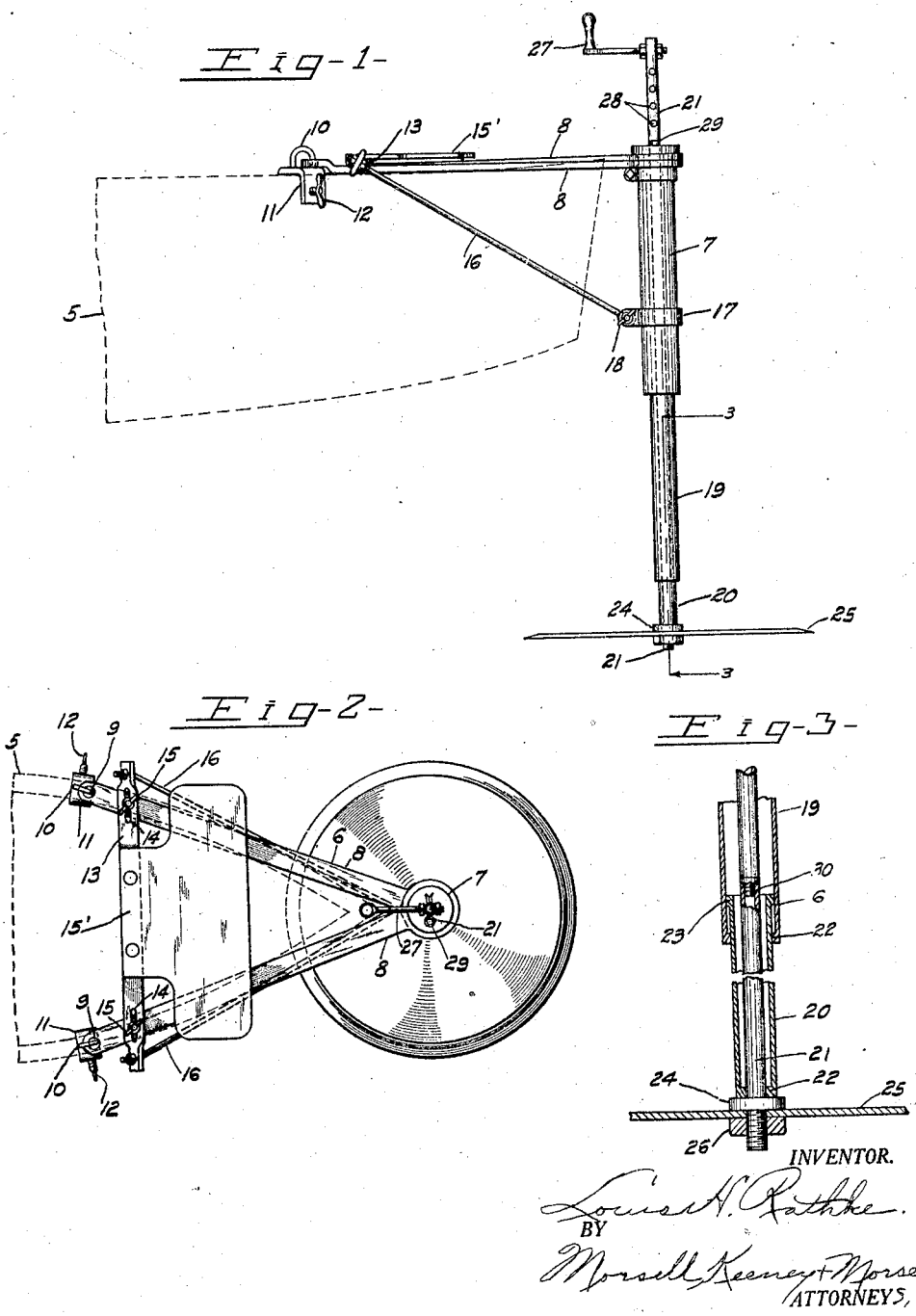

1,611,778

UNITED STATES PATENT OFFICE.

LOUIS H. RATHKE, OF MILWAUKEE, WISCONSIN.

WEED CUTTER.

Application filed October 9, 1924. Serial No. 742,597.

This invention relates to improvements in weed cutters more particularly adapted for cutting weeds under water.

It is one of the objects of the present invention to provide an underwater weed cutter adapted to be mounted on one end of a row boat which may be manually operated to cut the weeds close to the bottom of the lake or river.

A further object of the invention is to provide an underwater weed cutter which may be easily adjusted vertically to cut weeds at various depths of water without removing the cutter from the boat or water.

A further object of the invention is to provide a weed cutter having adjustable means for attaching the cutter to boats of various shapes and sizes.

A further object of the invention is to provide an underwater weed cutter having easily connectible means for bracing the cutter to relieve the strain on the rotatable shaft and also for preventing the rotation of the guard and bearing.

A further object of the invention is to provide an underwater weed cutter which is of simple construction, is strong and durable and is well adapted for the purpose described.

With the above and other objects in view the invention consists of the improved weed cutter and its parts and combinations as set forth in the claims, and all equivalents thereof.

In the accompanying drawing in which the same reference characters indicate the same parts in all of the views:

Fig. 1 is a side view of the improved weed cutter shown mounted on the stern portion of a boat, the boat being indicated by dotted lines;

Fig. 2 is a top view thereof; and

Fig. 3 is a vertical sectional detail view of the lower portion of the cutter, the section being taken on line 3—3 of Fig. 1.

Referring to the drawing the numeral 5 indicates the bow or stern portion of a row boat which is of the pointed type and upon which the improved underwater weed cutter 6 is mounted. Said weed cutter comprises a vertically extending tubular bearing member 7 provided at its upper end with pivotally connected arms 8 which are adapted to extend divergingly forwardly to rest on top of one end of the boat. The forward ends of the rods have eyes 9, and staples 10 extending through said eyes are attached to and form part of U-shaped clamps 11 which extend over the gunwale portions of the boat and are clamped thereto by thumb screws 12. A transverse bar 13 having elongated slots 14 in opposite end portions is adjustably mounted on the arms 8 by thumb screws 15 which extend through the slots and thread into the arms 8 to permit connection with boats of various widths. A platform or seat 15' rigidly mounted on the transverse bar 13 rests upon the arms 8 and provides a working platform for the operator. The outer ends of the bar 13 are twisted slightly and provided with holes for receiving the free ends of brace rods 16 which extend downwardly rearwardly and convergingly towards the tubular bearing 7 and are connected thereto by a split collar 17. A thumb screw 18 extending through end portions of the split collar and through eyes formed in the lower ends of the brace rods connects the rods to the collar and the collar to the tubular bearing.

The tubular bearing 7 telescopingly receives guard tubes 19 and 20, and the shaft 21 which also extends through the guard tubes and through the upper end portion of the tubular bearing 7. The telescoping tubes are formed with inwardly extending annular flanges 22 at their lower ends which are engaged by the outwardly extending annular flanges 23 formed on the upper ends of said tubes to serve as stops to prevent the separation of the guard member when in extended position. The lower end of the shaft 21 is provided with a collar 24 and a circular knife 25 which is mounted on the rod and bears against the collar and is removably held thereon by a nut 26 threaded on the shaft and bearing against the knife.

The upper end of the shaft is provided with a crank handle 27 for rotating the shaft and the knife thereon. The upper portion of the shaft is provided with transverse openings 28 for receiving a cotter pin 29 through any one of which to adjust the shaft and knife vertically to the desired depth as indicated in Fig. 1. The shaft may be formed of two or more sections threaded together as at 30 in Fig. 3.

In use the triangular frame is mounted on the end of the boat in the same manner shown and the shaft is adjusted to the desired height and the handle is turned to rotate the cutter as the boat is moved slowly along, and as thus operated the weeds will be cut along the path of travel of the boat.

The pivotal and triangular form of the frame permits mounting the said frame on boats of different widths while the telescoping guard tubes provide for adjusting the height of the shaft in a very simple manner.

What I claim as my invention is:

1. An underwater weed cutter, comprising a frame removably and adjustably mounted on a boat, a bearing carried by the frame, telescoping guard members extending downwardly from the bearing, brace members connected to the bearing and to the frame, a shaft extending through the telescoping members and the bearing and having a cutting disc at its lower end, and means at its upper end for rotating the shaft.

2. An underwater weed cutter, comprising a frame removably and adjustably mounted on a boat, a tubular bearing member carried by the outer ends of the frame, an angularly extending brace member connected to the frame and to the lower portion of the bearing member, tubular telescoping guard members extending downwardly from the bearing, and a shaft extending through the telescoping members and the bearing and having a cutting disc at its lower end, and means at its upper end for rotating the shaft.

3. An underwater weed cutter, comprising a tubular bearing member, diverging arms pivotally connected to the bearing member and having clamping means at their outer ends for adjustable connection with a boat, a transverse bar connected to the arms, angularly extending brace rods connected to the transverse bar and to the lower portion of the tubular bearing, tubular telescoping guard members extending downwardly from the bearing, a shaft extending through the bearing and the telescoping members and being vertically adjustable therein, a disk cutter connected to the lower end portion of the shaft, and a means connected to the upper portion of the shaft for rotating the shaft.

4. An underwater weed cutter, comprising a tubular bearing member, diverging arms pivotally connected in overlapping position to the bearing member, clamping members carried by the free ends of the arms for adjustable connection with a boat, a transverse bar adjustably connected to the arms adjacent their free ends, angularly extending brace rods connected to the bar and to the lower portion of the bearing member, guard tubes telescopingly connected to the tubular bearing, a shaft extending through the bearing and guard tubes, a disk cutter mounted on the lower end portion of the shaft, and a crank arm connected to the upper end portion of the shaft.

5. An underwater weed cutter, comprising a tubular bearing member, diverging arms pivotally connected in overlapping position to the bearing member, clamping members carried by the free ends of the arms for adjustable connection with a boat, a transverse bar adjustably connected to the arms adjacent their free ends, angularly extending brace rods connected to the bar and to the lower portion of the bearing member, guard tubes telescopingly connected to the tubular bearing, a shaft extending through the bearing and guard tubes, said shaft being provided with transverse openings through one of which a pin extends to hold the shaft in vertically adjusted position, a disk cutter mounted on the lower end portion of the shaft, and a crank arm connected to the upper end portion of the shaft.

6. An underwater weed cutter, comprising a tubular bearing member, a tubular guard member telescopingly extending into the lower portion of the bearing member, said tubular guard member having an inwardly extending flange at its lower end, another guard tube telescopingly extending into the last mentioned tube and having an outwardly extending upper flange which engages the lower flange of said first mentioned tube to limit the movement thereof, diverging arms pivotally connected to the upper end portion of the bearing tube and having eyes at their free ends, U-shaped clamping members connected to the eyed portions and provided with clamping screws, a transverse bar adjustably mounted on the arms, and having a platform which extends over the arms, brace rods connected to the outer ends of the transverse bar and extending convergingly downwardly and connected to the bearing member, a shaft extending through all of the tubes and having transverse openings in its upper portion for receiving a pin to adjust the height of the shaft, a disk cutter on the lower end of the shaft, and a crank handle connected to the upper end portion of the shaft.

In testimony whereof, I affix my signature.

LOUIS H. RATHKE.